(12) United States Patent
Canagasaby et al.

(10) Patent No.: US 7,636,411 B2
(45) Date of Patent: Dec. 22, 2009

(54) I/O LINK WITH CONFIGURABLE FORWARDED AND DERIVED CLOCKS

(75) Inventors: Karthisha S. Canagasaby, Santa Clara, CA (US); Sanjay Dabral, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 1048 days.

(21) Appl. No.: 10/610,316

(22) Filed: Jun. 30, 2003

(65) Prior Publication Data

US 2004/0264616 A1    Dec. 30, 2004

(51) Int. Cl.
*H04L 7/00* (2006.01)
(52) U.S. Cl. ..................................... 375/355
(58) Field of Classification Search ................. 375/359, 375/355, 362, 333; 370/216; 713/400; 327/156
See application file for complete search history.

(56) References Cited

U.S. PATENT DOCUMENTS

| | | | | |
|---|---|---|---|---|
| 5,592,519 A | * | 1/1997 | Honaker, Jr. | ................. 375/373 |
| 6,005,904 A | * | 12/1999 | Knapp et al. | ................. 375/376 |
| 6,144,674 A | * | 11/2000 | Peres et al. | ................. 370/516 |
| 6,208,183 B1 | * | 3/2001 | Li et al. | ........................ 327/161 |
| 6,417,705 B1 | * | 7/2002 | Tursi et al. | ................... 327/158 |
| 6,754,171 B1 | * | 6/2004 | Bernier et al. | ............... 370/216 |
| 6,977,537 B2 | * | 12/2005 | Chaudhuri et al. | ........... 327/156 |
| 6,977,973 B1 | * | 12/2005 | Wiggins | ...................... 375/333 |
| 7,187,738 B2 | * | 3/2007 | Naven et al. | ................. 375/355 |
| 2002/0044617 A1 | * | 4/2002 | Buchwald et al. | ............ 375/355 |
| 2002/0126785 A1 | * | 9/2002 | Maggio et al. | ............... 375/373 |
| 2003/0076851 A1 | * | 4/2003 | Mahajan et al. | .............. 370/419 |
| 2003/0081709 A1 | * | 5/2003 | Ngo et al. | ..................... 375/362 |
| 2004/0088594 A1 | * | 5/2004 | Canagasaby et al. | ......... 713/400 |
| 2004/0161070 A1 | * | 8/2004 | Yin et al. | ...................... 375/371 |
| 2007/0031153 A1 | * | 2/2007 | Aronson et al. | .............. 398/138 |

\* cited by examiner

*Primary Examiner*—Don N Vo
(74) *Attorney, Agent, or Firm*—Schwegman, Lundberg & Woessner, P.A.

(57) ABSTRACT

An electronic communications receiver includes a derived clock signal circuit operable to receive a data signal and to derive a derived clock signal from the received data signal. A separate forwarded clock signal circuit is further operable to receive a forwarded clock signal, and a clock management circuit is operable to receive signals from the derived clock signal circuit and the forwarded clock signal circuit, and to output an output clock signal.

24 Claims, 2 Drawing Sheets

I/O LINK WITH CONFIGURABLE FORWARDED AND DERIVED CLOCKS

FIELD OF THE INVENTION

The invention relates generally to electronic circuits, and more specifically to an I/O link with configurable forwarded and derived clocks.

BACKGROUND OF THE INVENTION

Computers and other electronic devices operate primarily by conveying electrical signals between components that comprise the device. Although electrical signals may be conveyed in a number of ways, such as by radio waves and by light, the principal form of communication of electrical signals between electrical devices or components remains transmission of the signals over a conductive metallic wire. In the context of computers and digital electronics, communication is typically performed by changing the state of a wire between one of two potentials to indicate a logical 1 or 0, with transitions between states occurring at regular intervals governed by an electronic clock signal.

Ideally, when a large amount of data is to be conveyed via wire, a large number of wires can be used to provide the capacity to transmit several elements of digital data at one time. In a computer system, for example, an 8-bit byte of digital information can be transmitted in one clock cycle if eight or more communication wires are available linking the sender and receiver. As a practical matter, wires beyond the eight needed to convey the byte of data would likely be used for purposes such as sending a clock signal indicating when the data on the other wires is expected to change, sending a ground or reference signal level, and to send other information including data flow control signals.

Unfortunately, it is often impractical for reasons of cost and physical space to run a large number of conductors between every element in a circuit, or between every device in an electronic system. In many circumstances, a single pair of wires must be used to send all data between components or devices, meaning that a single pair of wires must be used for data transmission, flow control, and clock recovery in a digital system. In some such systems, one wire carries the signal while another wire is at ground or some other reference potential. In other systems, the pair of wires are driven with a differential voltage, such that the wires are driven with either the same or no voltage to represent one digital symbol or with opposite positive and negative voltages to represent a second digital symbol.

This usually requires implementation of special techniques to recover a clock signal from the digital signal transitions observed in the pair of wires. For this reason, a clock signal is sometimes sent in a third wire, making recovery of the clock unnecessary at the expense of having to supply a third conductor. The circuit designer must then decide whether this third conductor is a justifiable expense, both in terms of cost and physical routing space, and select a receiver circuit appropriate to the selected clock scheme.

It is desired to simplify the clock recovery circuit design and selection process.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

The present invention provides a clock receiver that simplifies design and implementation of a circuit capable of functioning with a variety of clocking methods. In one embodiment, an electronic communications receiver comprises a derived clock signal circuit operable to receive a data signal and to derive a derived clock signal from the received data signal. A forwarded clock signal circuit is further operable to receive a forwarded clock signal, and a clock management circuit is operable to receive signals from the derived clock signal circuit and the forwarded clock signal circuit, and to output an output clock signal.

Figure 1:
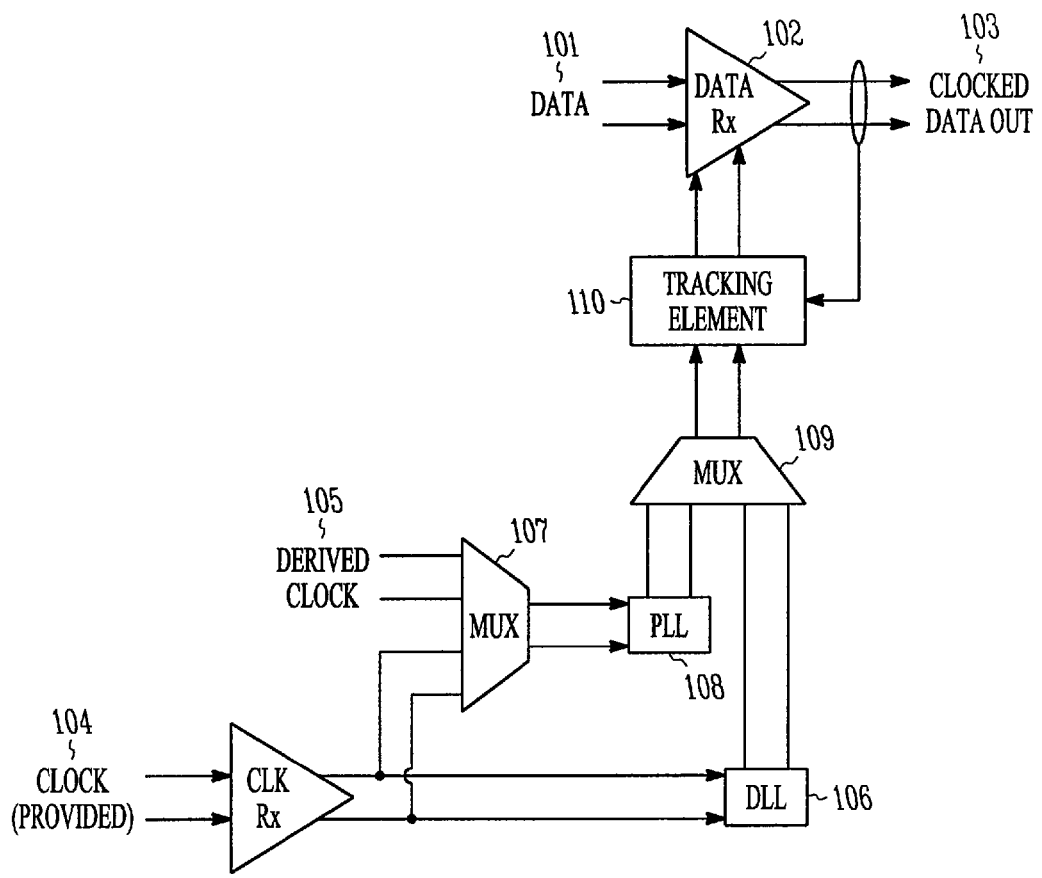
FIG. 1 shows a clock receiver circuit diagram, consistent with an embodiment of the present invention.

FIG. 1 shows in greater detail an example embodiment of such a clock receiver circuit. A data signal 101 is received by the data receiver circuit 102, which will use a provided clock signal 104 or a derived clock signal 105 to provide a clocked data output signal 103. The clock signal is provided to the data receiver circuit 102 in a variety of ways, including as a forwarded clock signal that is always sent along with the data signal, as a source synchronous clock signal that is sent along with the data signal only when data is present on the provided data signal, or as a derived clock signal 105 that is derived from observing transitions of the incoming data signal such as via a phase-locked loop. Recovery of a derived clock signal is also known as pleiosynchronous clocking, and involves using a separate crystal or clock frequency source in the receiver from that of the transmitter providing the data signal 101. In a mesosynchronous clock recovery system, the same crystal or frequency source is used, and although this largely eliminates frequency drift between devices the clock signal must still be derived form the provided frequency source and tracked over time to compensate for and avoid clock skew between the transmitter and receiver.

The provided clock signal 104, whether a forwarded or source synchronous signal, is provided to a delay locked loop 106, and to a multiplexler 107. The multiplexer also receives a derived clock signal 105, and selectively forwards either the derived clock signal or the provided clock signal to phase-locked loop (PLL) 108. The output of PLL 108 is sent to a second multiplexer 109, which selectively forwards either the derived clock signal 105 from multiplexer 107 and PLL 108 to the tracking element 110, or provides the provided clock signal 104 via the DLL 106.

In operation, the forwarded clock signal to be provided to the tracking element 110 will be selected via the multiplexers 107 and 109 as either a provided mesosynchronous clock, a provided pleiosynchronous clock, or a derived clock. For a derived clock, the incoming derived clock signal 105 comprises data signal 101 transitions when a data signal is available, which are provided to PLL 108 and cause the PLL to oscillate at a frequency determined by the transition frequency observed in the data signal 101. The signal from PLL 108 is then provided via MUX 109 to the tracking element.

When a mesosynchronous provided clock is provided at 104, the incoming clock signal is expected to be matched in frequency but potentially skewed from the timing of data signal 101. The clock is therefore routed to delay-locked loop 106, where it is forwarded to multiplexer 109 and to the tracking element 110. If the provided clock signal 104 is pleiosynchronous, or is not derived from the same reference clock as the incoming data system, the clock signal is forwarded to PLL 108 via the multiplexer 107. The pleiosynchronous clock signal is sent to the tracking element 110 after being processed by PLL 108 via selection in multiplexer 109.

The tracking unit 110 receives the incoming clock signals, and compares the phase of the clock signal to the phase of the data output signal 103. The tracking unit does this by detecting the centers of the data symbols comprising output signal 103, and of the clock signal provided by 110. A phase correction is then applied to the clock signal provided from tracking element 110 to the data receiver element 102. In some embodiments, the tracking element produces clock signals having fixed phase offsets (e.g. 90, 180, and 270 degrees offset) from the clock signal provided from multiplexer 109, and uses an interpolation function guided by the tracking unit to produce intermediate phase offsets if needed.

Embodiments of the invention such as that shown in FIG. 1 provide the circuit designer with a circuit that is both flexible and easy to incorporate into a larger circuit. Because various components are reused for different clock inputs, the circuit is also more compact and efficient than separate clock recovery circuits would be, making these embodiments of the present invention more desirable than separate clock recovery circuits for various clock recovery applications.

Figure 2:
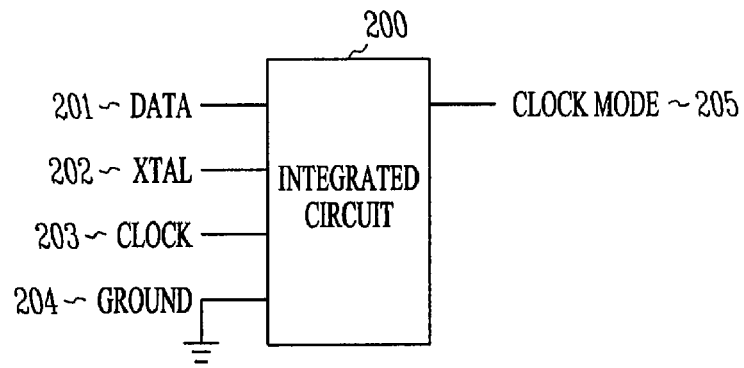
FIG. 2 shows an integrated circuit diagram, consistent with an embodiment of the present invention.

FIG. 2 illustrates the present invention embodied as a circuit module that is incorporated into an integrated circuit, consistent with an embodiment of the present invention. The integrated circuit 200 has a data input 201, through which the incoming data signal is received. A crystal input 202 provides a frequency source to serve as a reference for recovery of a derived clock signal when no external clock is provided. If present, the external clock signal is provided through clock input 203, which is a voltage signal provided with reference to ground 204 as are the other incoming signals.

The clock type in one embodiment is selected via clock mode selector 205, which is used for example to select the routing of multiplexers 107 and 109 of FIG. 1 to switch the circuit between modes such as the derived, mesosynchronous, and pleiosynchronous modes previously discussed in greater detail. In other embodiments of the invention, additional circuit components will be operable to detect the presence of various signals on the crystal input 202, the clock input 203, and the data input 201, and automatically select the appropriate clock mode and make the appropriate multiplexer switching selections depending on the signals received.

The present invention may be embodied not only as a stand-alone integrated circuit, but as a part of an integrated circuit that performs other functions. In one embodiment, the present invention is implemented as a standard block or cell element that may be incorporated as a pre-designed part of a larger circuit or integrated circuit, easing the design effort imposed on the circuit designer. The present invention is particularly well-suited to such application due to its flexibility and configurability, as well as to its efficiency in re-use of components for different clock recovery modes.

Figure 3:
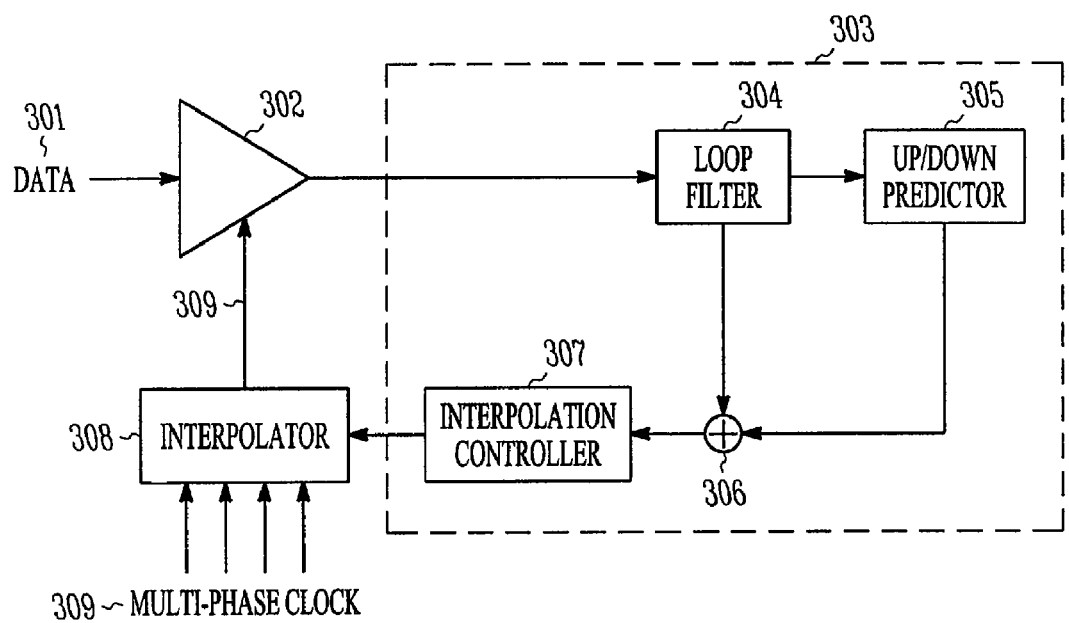
FIG. 3 illustrates the operation of one embodiment of a tracking and phase interpolation unit, as used in some embodiments of the present invention.

FIG. 3 illustrates the operation of one embodiment of a tracking and phase interpolation unit, as used in some embodiments of the present invention. The incoming data signal 301 is received in the data receiver circuit 302, the output of which is forwarded to the tracking unit 303. The tracking unit processes the incoming data signal in loop filter 304 before forwarding the signal to the up/down predictor 305.

The up/down predictor 305 estimates whether the clock phase should be shifted up or down to maintain synchronization with the incoming data signal, and provides its output to be summed with the output of loop filter 304. This signal is then received and processed by the interpolation controller 307, which directs the interpolator 309 as to how to derive the required clock signal from the provided multi-phase clock 309. The multi-phase clock 309 in the present example comprises a clock signal with no phase offset, as well as the same clock signal offset by 90, 180, and 270 degrees.

The interpolator and the associated circuitry shown in FIG. 3 are configured to direct the interpolator 308 to interpolate between these provided clock signals as needed, to produce a data sampling clock signal 309 that may be of any required arbitrary phase offset from the provided multi-phase clock signals 309. For example, if a phase offset of 210 degrees is required, the interpolator is directed to interpolate between the 180 degree offset clock signal and the 270 degree offset clock signal provided as part of the multi-phase clock signal 309 to produce the required data sampling clock. These elements and their corresponding functions as described here are in some embodiments of the invention implemented in a tracking unit such as 110 within a circuit such as that shown in FIG. 1. In other embodiments, the function of the tracking element as described in conjunction with FIG. 1 will be implemented in other ways, such as with digital logic, analog filters, phase-locked loops, or any other method consistent with the claims as presented below.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

The invention claimed is:

1. An electronic communications receiver, comprising:
   a derived clock signal circuit operable to receive a data signal and to derive a derived clock signal from the received data signal;
   a forwarded clock signal circuit operable to receive a forwarded clock signal forwarded with and corresponding to the data signal; and
   a clock management circuit operable to receive clock signals from the derived clock signal circuit and the forwarded clock signal circuit, and to output an output clock signal.

2. The electronic communications receiver of claim 1, wherein the derived clock signal circuit is operable to derive a mesosynchronous clock signal by using the same system clock as a transmitter.

3. The electronic communications receiver of claim 1, wherein the derived clock signal circuit is operable to derive a pleiosynchronous clock signal by using a system clock other than that of a transmitter.

4. The electronic communications receiver of claim 1, wherein the forwarded clock circuit comprises a delay element operable to compensate for phase offset of the forwarded clock relative to a received data signal.

5. The electronic communications receiver circuit of claim 1, wherein the derived clock circuit comprises a phase tracking element operable to adjust the phase of the derived clock signal relative to a received data signal.

6. The electronic communications receiver circuit of claim 1, wherein both the derived clock signal circuit and the forwarded clock signal circuit are operable to provide a clock signal to a selector circuit, the selector circuit operable to provide a selected clock signal to a data receiver circuit.

7. The electronic communications receiver circuit of claim 6, wherein a phase tracking element operable to adjust the phase of the derived clock signal relative to a received data signal is connected between the selector circuit and the data receiver circuit.

8. The electronic communications receiver of claim 1, wherein the clock management circuit is operable to automatically output an output clock signal provided by the received derived clock signal circuit when the forwarded clock signal circuit is not receiving a forwarded clock signal.

9. An integrated circuit, comprising:
 a derived clock signal circuit operable to receive a data signal and to derive a derived clock signal from the received data signal;
 a forwarded clock signal circuit operable to receive a forwarded clock signal forwarded with and corresponding to the data signal; and
 a clock management circuit operable to receive clock signals from the derived clock signal circuit and the forwarded clock signal circuit, and to output an output clock signal.

10. The integrated circuit of claim 9, wherein the derived clock signal circuit is operable to derive a mesosynchronous clock signal by using the same system clock as a transmitter.

11. The integrated circuit of claim 9, wherein the derived clock signal circuit is operable to derive a pleiosynchronous clock signal by using a system clock other than that of a transmitter.

12. The integrated circuit of claim 9, wherein the forwarded clock circuit comprises a delay element operable to compensate for phase offset of the forwarded clock relative to a received data signal.

13. The integrated circuit of claim 9, wherein the derived clock circuit comprises a phase tracking element operable to adjust the phase of the derived clock signal relative to a received data signal.

14. The integrated circuit of claim 9, wherein both the derived clock signal circuit and the forwarded clock signal circuit are operable to provide a clock signal to a selector circuit, the selector circuit operable to provide a selected clock signal to a data receiver circuit.

15. The integrated circuit of claim 14, wherein a phase tracking element operable to adjust the phase of the derived clock signal relative to a received data signal is connected between the selector circuit and the data receiver circuit.

16. The integrated circuit of claim 9, wherein the clock management circuit is operable to automatically output an output clock signal provided by the received derived clock signal circuit when the forwarded clock signal circuit is not receiving a forwarded clock signal.

17. A computerized system, comprising:
 a derived clock signal circuit operable to receive a data signal and to derive a derived clock signal from the received data signal;
 a forwarded clock signal circuit operable to receive a forwarded clock signal forwarded with and corresponding to the data signal; and
 a clock management circuit operable to receive clock signals from the derived clock signal circuit and the forwarded clock signal circuit, and to output an output clock signal.

18. The computerized system of claim 17, wherein the derived clock signal circuit is operable to derive a mesosynchronous clock signal by using the same system clock as a transmitter.

19. The computerized system of claim 17, wherein the derived clock signal circuit is operable to derive a pleiosynchronous clock signal by using a system clock other than that of a transmitter.

20. The computerized system of claim 17, wherein the forwarded clock circuit comprises a delay element operable to compensate for phase offset of the forwarded clock relative to a received data signal.

21. The computerized system of claim 17, wherein the derived clock circuit comprises a phase tracking element operable to adjust the phase of the derived clock signal relative to a received data signal.

22. The computerized system of claim 17, wherein both the derived clock signal circuit and the forwarded clock signal circuit are operable to provide a clock signal to a selector circuit, the selector circuit operable to provide a selected clock signal to a data receiver circuit.

23. The computerized system of claim 22, wherein a phase tracking element operable to adjust the phase of the derived clock signal relative to a received data signal is connected between the selector circuit and the data receiver circuit.

24. The computerized system of claim 17, wherein the clock management circuit is operable to automatically output an output clock signal provided by the received derived clock signal circuit when the forwarded clock signal circuit is not receiving a forwarded clock signal.

\* \* \* \* \*